(12) United States Patent
Zelmer et al.

(10) Patent No.: US 7,370,721 B2
(45) Date of Patent: May 13, 2008

(54) SEATBELT TENSIONING DEVICE AND METHOD

(75) Inventors: Thomas Zelmer, Auburn Hills, MI (US); Jon E. Burrow, Ortonville, MI (US); Jennifer Grove, White Lake, MI (US)

(73) Assignee: Autoliv ASP, Inc., Ogden, UT (US)

( * ) Notice: Subject to any disclaimer, the term of this patent is extended or adjusted under 35 U.S.C. 154(b) by 480 days.

(21) Appl. No.: 11/004,116

(22) Filed: Dec. 3, 2004

(65) Prior Publication Data

US 2006/0118347 A1   Jun. 8, 2006

(51) Int. Cl.
*B60R 22/195* (2006.01)
(52) U.S. Cl. .............. 180/269; 180/270; 280/801.2
(58) Field of Classification Search ............ 180/268, 180/269, 270; 280/806, 801.2
See application file for complete search history.

(56) References Cited

U.S. PATENT DOCUMENTS

| | | | |
|---|---|---|---|
| 3,522,918 A * | 8/1970 | Wrighton ............... 244/122 R |
| 4,603,819 A * | 8/1986 | Loose et al. ............. 242/379 |
| 5,522,564 A | 6/1996 | Schmidt et al. |
| 5,547,143 A | 8/1996 | Miller, III et al. |
| 5,558,370 A * | 9/1996 | Behr .................. 280/806 |
| 5,651,564 A * | 7/1997 | Isaji et al. ............. 280/806 |
| 5,820,058 A | 10/1998 | Hirzel et al. |
| 5,873,599 A * | 2/1999 | Bauer et al. ............ 280/806 |
| 5,936,186 A * | 8/1999 | Wier .................. 102/202.14 |
| 5,938,135 A | 8/1999 | Sasaki et al. |
| 6,012,667 A | 1/2000 | Clancy, III et al. |
| 6,105,893 A | 8/2000 | Schmidt et al. |
| 6,105,894 A | 8/2000 | Singer et al. |
| 6,142,524 A * | 11/2000 | Brown et al. ........... 280/806 |
| 6,241,172 B1 * | 6/2001 | Fugel et al. ............ 242/379.1 |
| 6,267,314 B1 | 7/2001 | Singer et al. |
| 6,330,500 B1 * | 12/2001 | Moriyama et al. ......... 701/45 |
| 6,364,238 B1 | 4/2002 | Weller |
| 6,485,058 B1 * | 11/2002 | Kohlndorfer et al. ...... 280/808 |
| 6,616,081 B1 | 9/2003 | Clute et al. |
| 6,616,186 B1 * | 9/2003 | Midorikawa et al. ...... 280/801.1 |
| 6,669,234 B2 * | 12/2003 | Kohlndorfer et al. ..... 280/801.1 |
| 6,729,649 B1 | 5/2004 | Schmidt |
| 6,757,611 B1 * | 6/2004 | Rao et al. ............... 701/301 |
| 6,897,768 B2 * | 5/2005 | Sato et al. .............. 340/435 |
| 7,011,338 B2 * | 3/2006 | Midorikawa et al. ....... 280/735 |
| 7,138,938 B1 * | 11/2006 | Prakah-Asante et al. .... 342/70 |
| 7,140,641 B2 * | 11/2006 | Ingemarsson et al. ...... 280/805 |
| 2002/0096591 A1 * | 7/2002 | Tanji ................... 242/390.8 |
| 2003/0034883 A1 * | 2/2003 | Sato et al. .............. 340/435 |
| 2003/0047931 A1 * | 3/2003 | Rees et al. .............. 280/806 |
| 2003/0071446 A1 * | 4/2003 | Haderer et al. ........... 280/735 |

(Continued)

*Primary Examiner*—Ruth Ilan
*Assistant Examiner*—Karen J. Amores
(74) *Attorney, Agent, or Firm*—Sally J Brown; Brinks Hofer Gilson & Lione

(57) ABSTRACT

A device and method for tensioning a vehicle seatbelt are disclosed. The device has a motor, a pulley, a first cable, and a seatbelt buckle. The motor has a motor output for transferring rotational energy developed in the motor. The pulley is in communication with the motor output for receiving the rotational energy developed in the motor. The first cable has first and second ends. The first end is coupled to the pulley. The seatbelt buckle is coupled to the second end of the cable. The rotation of the pulley causes movement of the seatbelt buckle.

21 Claims, 6 Drawing Sheets

U.S. PATENT DOCUMENTS

| | | | |
|---|---|---|---|
| 2003/0122020 A1* | 7/2003 | Tanji | 242/374 |
| 2003/0213864 A9* | 11/2003 | Hamaue et al. | 242/374 |
| 2004/0045757 A1* | 3/2004 | Midorikawa et al. | 180/268 |
| 2004/0212188 A1* | 10/2004 | Terasaki | 280/806 |
| 2005/0040631 A1* | 2/2005 | Clancy et al. | 280/735 |
| 2005/0143886 A1* | 6/2005 | Theisen | 701/45 |
| 2006/0087108 A1* | 4/2006 | Midorikawa | 280/806 |
| 2006/0108787 A1* | 5/2006 | Czaykowska et al. | 280/806 |
| 2006/0118347 A1* | 6/2006 | Zelmer et al. | 180/268 |
| 2006/0226694 A1* | 10/2006 | Higuchi et al. | 297/480 |
| 2006/0249946 A1* | 11/2006 | Bachmann et al. | 280/806 |
| 2006/0267331 A1* | 11/2006 | Tanaka | 280/806 |
| 2007/0024045 A1* | 2/2007 | Zelmer et al. | 280/806 |
| 2007/0029775 A1* | 2/2007 | Tomita | 280/806 |
| 2007/0194565 A1* | 8/2007 | Clute | 280/806 |
| 2007/0199758 A1* | 8/2007 | Saito et al. | 180/268 |
| 2007/0276566 A1* | 11/2007 | Diebold et al. | 701/45 |

* cited by examiner

SEATBELT TENSIONING DEVICE AND METHOD

TECHNICAL FIELD

The present invention relates to systems and methods for adjusting seatbelt tension prior to a vehicle impact as well as in non-impact conditions.

BACKGROUND

Devices for pre-tensioning a seatbelt prior to a vehicle collision have been in existence for many years and under constant development. The tensioning of the seatbelt prior to the sensing of vehicle impact and prior to the pre-tensioning that occurs just before vehicle impact is a more recent development in seatbelt tensioning and is known in the art as "pre-pretensioning". These systems employ a motorized pre-pretensioning retractor that is activated during pre-impact situations and/or in non-impact situations when the sensing system initiates a vehicle pre-impact signal.

Early tensioning of the seatbelt can improve occupant kinematics during a vehicle collision and help reduce or prevent injury to an occupant. Another advantage of pre-crash/impact tensioning of the seatbelt is the tactile feedback that a driver receives from the seatbelt that warns the driver to take action. Pre-pretensioning devices are reversible allowing for early activation prior to impact and in cases where impact does not occur, the system returns to a normal tensioning level.

U.S. Pat. No. 6,616,186 issued to NSK Autoliv discloses systems and methods for undertaking pre-pretensioning and is hereby incorporated by reference. Further, U.S. Pat. No. 6,616,186 discloses systems having multiple belt tensioning devices and a motor driven retractor and is hereby incorporated by reference.

While current pre-pretensioning devices and methods for pre-pretensioning a vehicle seatbelt achieve their intended purpose, many enhancements and additional features are needed. Therefore, a new and improved pre-pretensioning system and method would be desirable.

SUMMARY

In an aspect of the present invention a device for tensioning a vehicle seatbelt is provided. The device has a motor, a pulley, a first cable, and a seatbelt buckle. The motor has a motor output for transferring rotational energy developed in the motor. The pulley is in communication with the motor output for receiving the rotational energy developed in the motor. The first cable has first and second ends. The first end is coupled to the pulley. The seatbelt buckle is coupled to the second end of the cable. The rotation of the pulley causes movement of the seatbelt buckle.

In another aspect of the present invention, the device further includes a second cable, wherein the second cable has a second cable first end and a second cable second end.

In still another aspect of the present invention, the second cable first end is coupled to the motor output.

In still another aspect of the present invention, the second cable second end is coupled to the pulley.

In still another aspect of the present invention, the second cable second end further includes a spline that engages a ring gear in the pulley.

In still another aspect of the present invention, the device further includes a spindle disposed through a bore in the pulley for slidably engaging and supporting the pulley.

In still another aspect of the present invention, the device further includes an attachment bracket for securing the pulley to a vehicle structure.

In still another aspect of the present invention, the device further includes a torsion member having a first end disposed within a bore in the spindle and a second end disposed within an aperture in the attachment bracket.

In still another aspect of the present invention, the device further includes a pyrotechnic pretensioner coupled to the pulley.

In still another aspect of the present invention, the pulley further includes a ball track for receiving a plurality of balls injected by the pyrotechnic pretensioner thereby causing the pulley to rotate.

In yet another aspect of the present invention, a method for tensioning a vehicle seatbelt is provided. The method includes detecting a pre-impact condition, activating a first device connected to the vehicle seatbelt to tension the vehicle seatbelt if the pre-impact condition has been detected, determining whether a second device for tensioning the vehicle seatbelt has been activated within a predefined period of time, determining whether the predefined period of time has elapsed, and releasing the tension on the seatbelt if the second device has not been activated within the predefined period of time and the pre-impact condition has not been detected after the predefined period of time has elapsed.

In yet another aspect of the present invention, the method further includes determining whether the vehicle ignition has been activated.

In yet another aspect of the present invention, the method further includes determining whether the vehicle seatbelt is buckled.

In yet another aspect of the present invention, the method further includes determining whether the vehicle is stable.

In yet another aspect of the present invention, the method further includes activating a warning if the vehicle is determined to be unstable.

In yet another aspect of the present invention, the method further includes determining a state of a vehicle transmission.

In yet another aspect of the present invention, the method further includes determining a position of a seatbelt buckle.

In yet another aspect of the present invention, the method further includes activating a motor to change the position of the seatbelt buckle based on the determined position.

In yet another aspect of the present invention, the method further includes monitoring a current supplied to the motor.

In yet another aspect of the present invention, the method further includes comparing the monitored current to a current limit threshold.

In yet another aspect of the present invention, the method further includes deactivating the motor when the current has reached the current limit threshold.

These and other aspects and advantages of the present invention will become apparent upon reading the following detailed description of the invention in combination with the accompanying drawings.

DESCRIPTION

Figure 1:
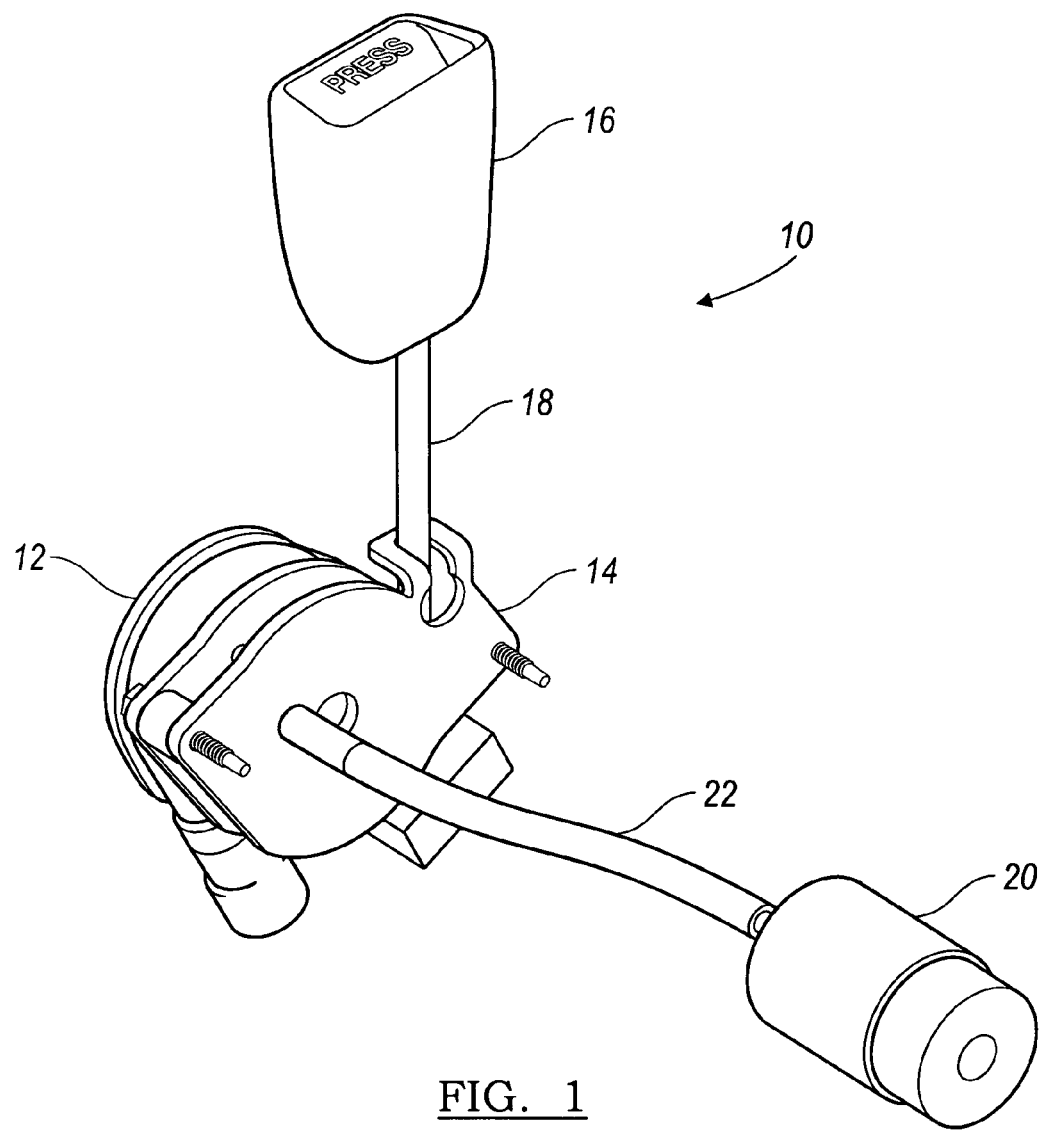
FIG. 1 is a perspective view of a seatbelt buckle pre-pretensioner with an integrated roto-pretensioning device, in accordance with an embodiment of the present invention.

Referring now to FIG. 1, a device 10 for tensioning a vehicle seatbelt is illustrated, in accordance with an embodiment of the present invention. Device 10 may include an integrated roto-pretensioner 12. Generally, device 10 has an attachment plate 14, a seatbelt buckle 16 and a motor 20. Attachment plate 14 secures device 10 to a vehicle structure (not shown), i.e. a vehicle seat. The seatbelt buckle 16 functions as a traditional seatbelt buckle in that it receives and locks a seatbelt latch plate therein. Seatbelt buckle 16 is securely attached to a flexible cable 18 that secures buckle 16 to attachment plate 14 as will be described below. Motor 20 is provided to drive a flexible cable 22 that in turn causes cable 18 to retract or protract from attachment plate 14.

Figure 2:
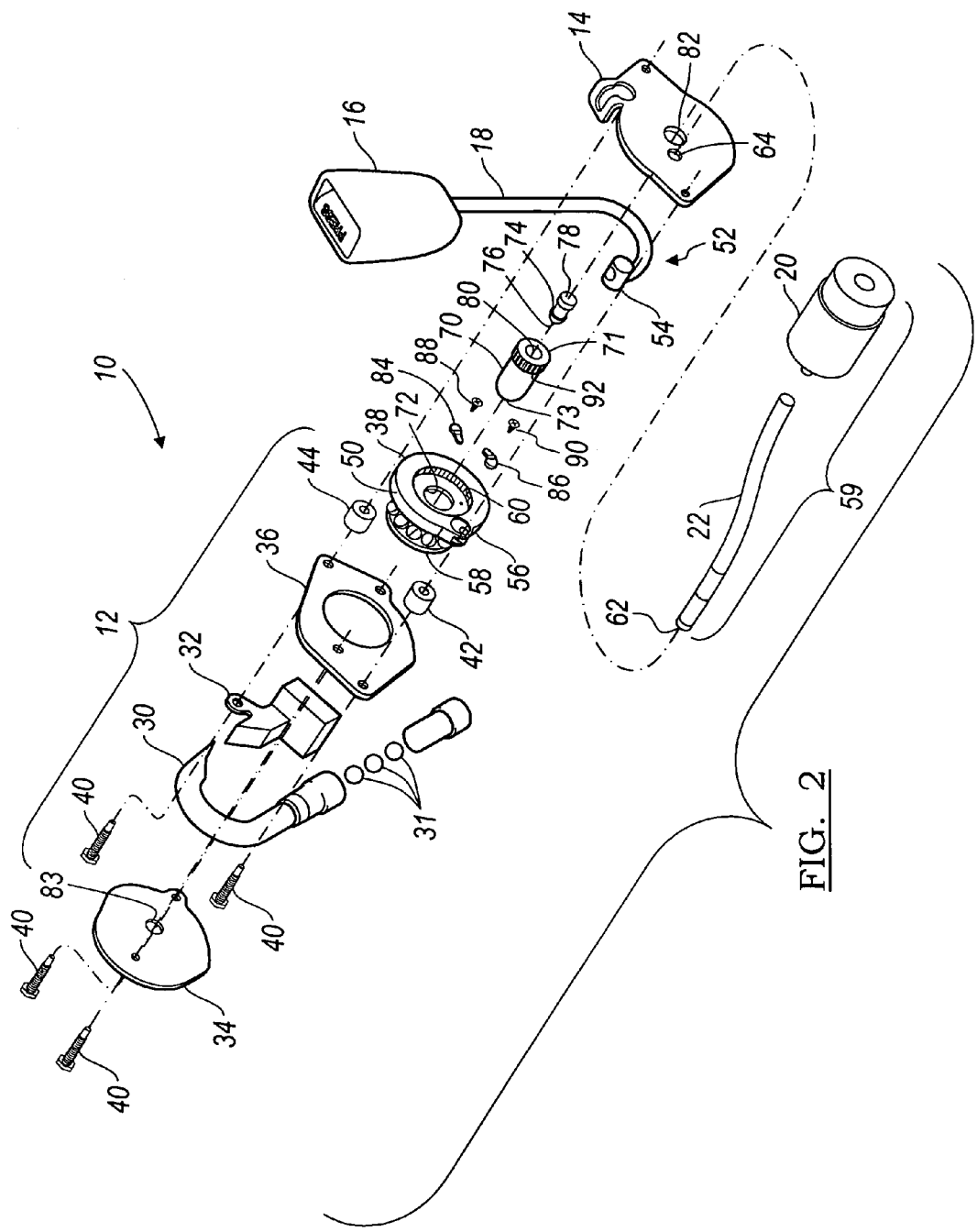
FIG. 2 is an exploded perspective view of the device shown in FIG. 1, in accordance with an embodiment of the present invention.

Referring now to FIG. 2, an exploded view of device 10 is provided to illustrate the internal components of device 10, in accordance with an embodiment of the present invention. Device 10, generally, includes two mechanisms for adjusting the length of buckle cable 18. The first mechanism is roto-pretensioner 12 for pretensioning the seatbelt webbing by rapidly retracting buckle cable 18 when a vehicle collision is detected and the second mechanism is a pre-pretensioning mechanism 59. Roto-pretensioner 12 is preferably a pyrotechnic pretensioner that includes a ball tubs 30, balls 31 and ball catch 32. Ball tube 30 and ball catch 32 are sandwiched between and held in place by an end plate 34 and an intermediate plate 36 forming a roto-pretensioner assembly 12. Assembly 12 is secured to attachment plate 14 using a plurality of screws, bolts or the like 40. Spacers 42 and 44 are used to provide the proper spacing between intermediate plate 36 and attachment plate 14, i.e. to accommodate a pulley 38 therebetween.

Pulley 38 receives buckle cable 18. Buckle cable 18 is wound around pulley 38 and disposed within a pulley channel 50. At an end 52 of buckle cable 18, a barrel member 54 is attached. Barrel member 54 engages a slot 56 disposed in pulley 38. The engagement of barrel member 54 with slot 56 in pulley 38 securely fixes end 52 of cable 18 to pulley 38. Integrally connected to pulley 38 is a rotary ball track 58. Rotary ball track 58 cooperates with ball tube 30 and balls 31 that are injected into ball tube 30 and along rotary ball track 58 causing pulley 38 to swiftly rotate. The swift rotation of pulley 38 causes cable 18 to rapidly wind around pulley 38 within channel 50, thus reducing the length or height of buckle 16 relative to attachment plate 14. The reduction in length of buckle cable 18 in turn tensions the seatbelt webbing attached to the locking plate (not shown) that is engaged with buckle 16.

Pre-pretensioning mechanism 59 contained within device 10 will now be described with continuing reference to FIG. 2, in accordance with an embodiment of the present invention. Pre-pretensioning mechanism 59 includes motor 20, motor cable 22 and pulley 38. Pulley 38 includes an outer ring gear 60 having internal teeth that cooperates with a spline gear 62 on the end of motor cable 22. More specifically, spline 62 extends through aperture 64 in attachment plate 14 and engages the internal teeth of outer ring gear 60. In operation, motor 20 is activated and rotates motor cable 22 and spline gear 62 causing subsequent movement of pulley 38 through meshed interaction of spline 62 with outer ring gear 60. As pulley 38 is rotated, the length of buckle cable 18 is either extended or reduced depending on the direction of rotation. Rotational movement of pulley 38 in the clockwise direction reduces the length of buckle cable 18 while rotational movement of pulley 38 in the counter-clockwise direction lengthens buckle cable 18 or increases the height of buckle 16 relative to attachment plate 14.

Device 10 further includes a load limiting mechanism to allow buckle 16 to protract from attachment plate 14 after a prescribed loading on the seatbelt is reached during a vehicle collision. The load limiting mechanism includes a spindle 70 that is threaded through an aperture 72 disposed in pulley 38 to rotationally support pulley 38. Spindle 70 includes a first spindle end 71 and a second spindle end 73. The load limiting mechanism further includes a torsion bar 74 that has a first end 76 that mates with a cooperating at first spindle end 71 with bore 80 disposed in spindle 70 and a second end 78 that matingly cooperates with an aperture 82 disposed in attachment plate 14. Thus, first end 76 of torsion bar 74 is rotationally fixed with spindle 70 and second end 78 of torsion bar 74 is rotationally fixed and support by attachment plate 14. Second spindle end 73 of spindle 70 is matingly received and supported by an aperture 83 in end plate 34.

A pair of lock pawls 84 and 86 are mounted within an inboard of outer ring gear 60 by a pair of mounting screws or bolts 88 and 90. Locking pawls 84, 86 are inertial members that upon swift rotational acceleration rotate into a spline gear 92 dispose at first spindle end 71 on spindle 70. Thus, in operation, when pulley 38 is swiftly accelerated, locking pawls 84 and 86 are rotated into spline gear 92 thereby locking and rotationally fixing pulley 38 with respect to spindle 70.

Figure 3:
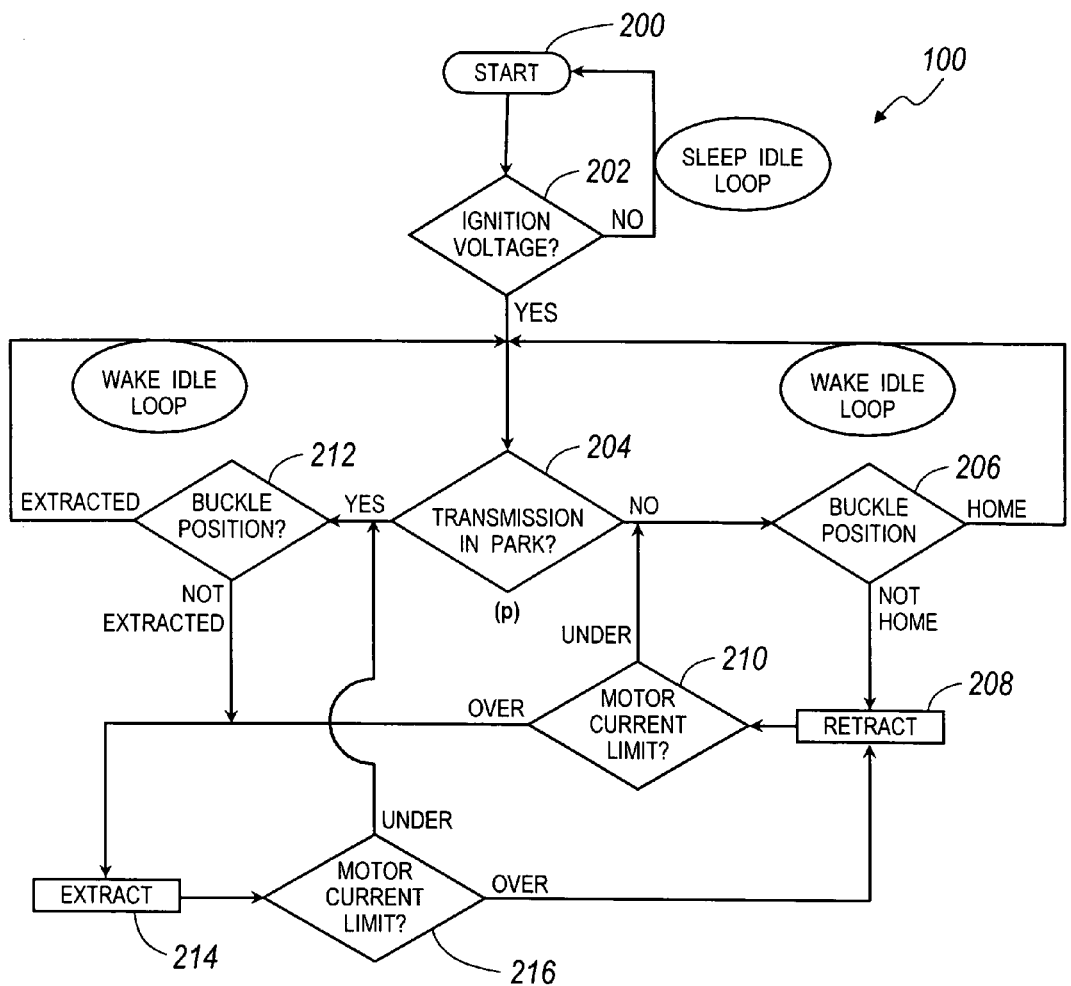
FIG. 3 is a flow diagram illustrating the method of operation of a system utilizing the pre-pretensioning device shown in FIG. 1, in accordance with an embodiment of the present invention.

Referring now to FIG. 3, a control strategy 100 for controlling a system having device 10 is illustrated in flowchart form, in accordance with an embodiment of the present invention. The control method 100 is initiated when a driver enters the vehicle, as represented by block 200. The seatbelt buckle, at this point, will already be in the "presented" state, which means that it is raised and in a higher position than it would be when the seatbelt is buckled and in use. The driver buckles the seatbelt by inserting the seatbelt latch plate into the buckle. This is done more easily since the seatbelt buckle is at a higher position, relative to the seat. At block 202 the ignition of the vehicle engine is monitored. If the driver does not start the ignition, then the system returns to block 200 and the ignition (voltage) is checked again. However, if the driver starts the ignition then, at block 204, the system determines whether the driver has moved the transmission of the vehicle out of the park position. If the driver has moved the transmission out of park, then motor 20 of device 10 is activated and pulls the buckle downward to a normal seatbelt buckled position or "home" position. Movement of the seatbelt buckle is accomplished by first monitoring the position of the buckle, at block 206. If the buckle is in the home position then the system returns to block 204. However, if the buckle is not in the "home" position then the system activates motor 20 to retract the buckle at block 208 and monitors the current draw of the motor, as represented by block 210. Once a predefined motor current limit has been reached the system determines that the buckle is in the "home" position and stops buckle retraction, as represented by blocks 206 and 210. If the passenger side is equipped with the same tensioning device 10, the passenger buckle will be pulled down in unison with the driver side buckle. If the driver returns the transmission to the park position, the buckle will move back up to an extracted position to allow for easy unbuckling of the latch plate from the buckle.

After the transmission has been placed back into the park position, the buckle position is monitored to determine the next action to take, as represented by block 212. If the buckle is extracted or not in the "home" position, then the system returns to block 204. However, if the buckle is not extracted or in the "home" position then the system extracts the buckle and monitors the motor current, as represented by blocks 214 and 216. At block 216, the system determines whether the motor current has exceeded a predefined motor current limit. Once the predefined motor current limit has been reached the system determines that the buckle is in the not "home" position and stops buckle extraction, as represented by blocks 212 and 216.

Figure 4:
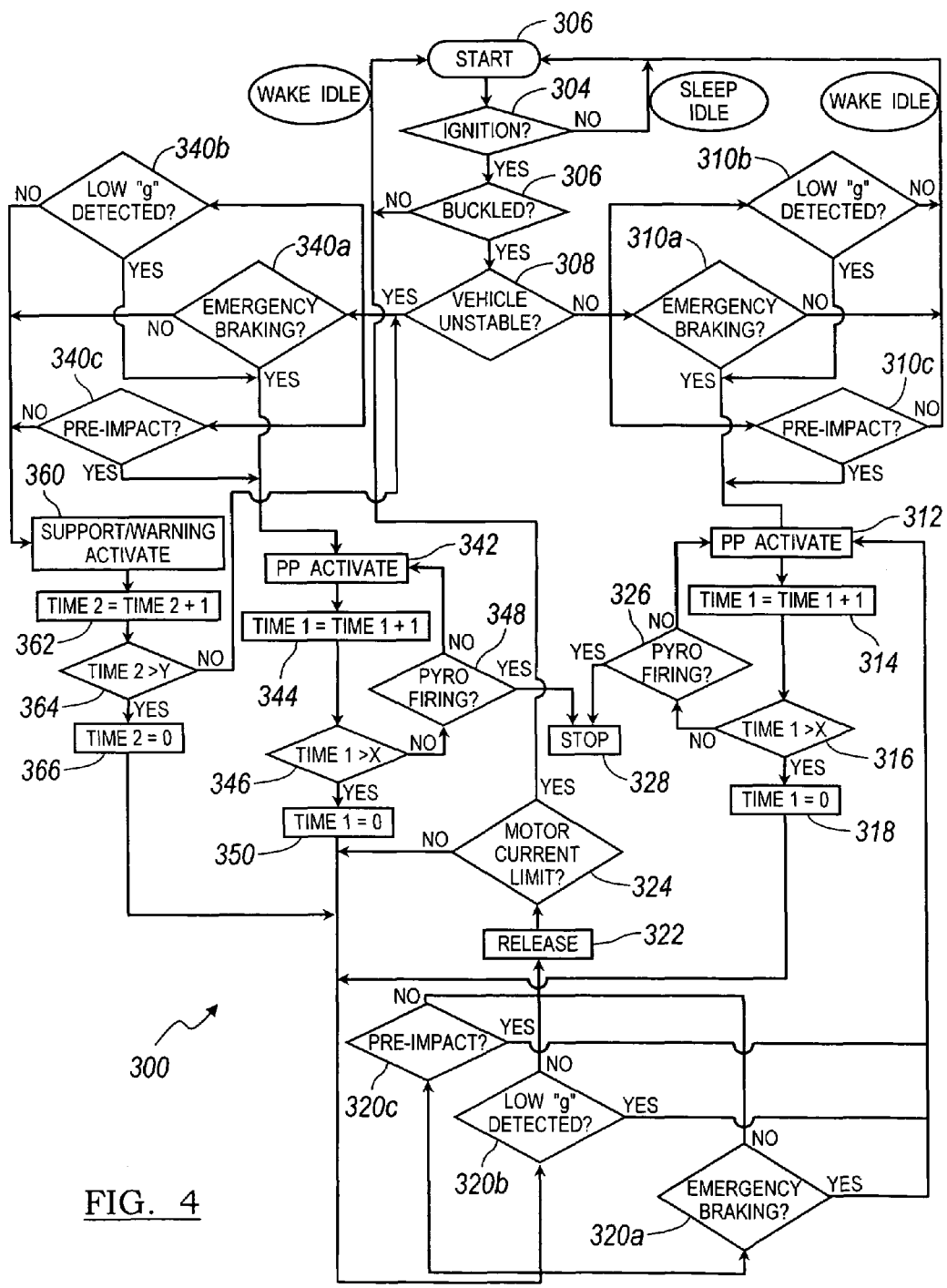
FIG. 4 is a flow diagram illustrating an alternate control strategy for providing pre-pretensioning as well as standard pretensioning of a vehicle seatbelt, in accordance with an embodiment of the present invention.

Referring now to FIG. 4, an alternate control strategy 300 is provided for a system that has a pre-pretensioner and a standard pretensioner device (i.e. device 10), in accordance with an embodiment of the present invention. The control strategy is initiated, at block 302, when the driver enters the vehicle. At block 304, the ignition is checked to determine whether it has been activated. If the ignition has not been activated, the system returns to block 302. However, if the ignition has been activated, the system checks whether the seatbelt buckle has been fastened, as represented by block 306. If the seatbelt has been buckled, then at block 308, the system determines whether the vehicle is unstable. If the system determines that the vehicle is stable, then at block 310a, b and c the system determines whether an emergency braking, a low vehicle deceleration (low "g"), or a pre-impact condition exists. If none of these conditions exist then the system returns to block 302. However, if any of they conditions exist, then the system activates pre-pretensioning at block 312. At block 314, a counter is activated and at block 316, the system determines whether the counter has exceeded a predefined threshold X. If the counter has exceeded the predefined threshold X, then the counter is reset at block 318 and the system checks whether the any of the three conditions mentioned above still exist, as represented by blocks 320a, b and c. If the three conditions mentioned above do not exist, then the system releases the buckle and monitors motor current until a motor current limit has been reached, as represented by blocks 322 and 324. Once the motor current threshold has been reached the system returns to block 302.

If, however, at block 316, the timer has not reached the predefined threshold X, the system determines whether pyrotechnic pretensioning has been activated, as represented by block 326. If the system determines that the pyrotechnic pretensioner has not been activated, then the system returns to block 312. If the system determines that the pyrotechnic pretensioner has been activated, then the system stops, at block 328.

If however at block 308, the vehicle is determined to be unstable, then the system checks whether the emergency braking, the low deceleration, or pre-impact conditions exist at blocks 340a, b, and c. If any of these conditions exist, then the pre-pretensioner is activated at block 342. A timer is started at block 344 and at block 346 the system determines whether the timer has exceeded a predefined threshold X. If the timer has not exceeded a predefined threshold X' then the system determines at block 348 whether the pyrotechnic pretensioner has been fired. If the pyrotechnic pretensioner has not been fired, then the system returns to block 342. However, if the pyrotechnic pretensioner has been fired at block 348, the system stops as represented by block 328.

If, however, the timer has exceeded the predefined threshold X', at block 346, then the timer is reset at block 350 and the system checks whether the any of the three conditions mentioned above still exist, as represented by blocks 320a, b and c. If the three conditions mentioned above do not exist, then the system releases the buckle and monitors motor current until a motor current limit has been reached, as represented by blocks 322 and 324. Once the motor current threshold has been reached the system returns to block 302.

However, if at blocks 340a, b and c, none of the three conditions exist, then the system activates a support/warning, at block 360. At block 362, a timer is activated. At block 364 the system determines whether the timer has exceeded a predefined threshold Y. If the timer has not exceeded a predefined threshold Y, then the system returns to block 308. However, if the system has determined at block 364 that the timer has exceeded the predefined threshold Y, the timer is reset at block 366 and the system determines whether any of the three conditions exist, as represented by blocks 320a, b, and c. If the three conditions mentioned above do not exist, then the system releases the buckle and monitors motor current until a motor current limit has been reached, as represented by blocks 322 and 324. Once the motor current threshold has been reached the system returns to block 302.

Figure 5:
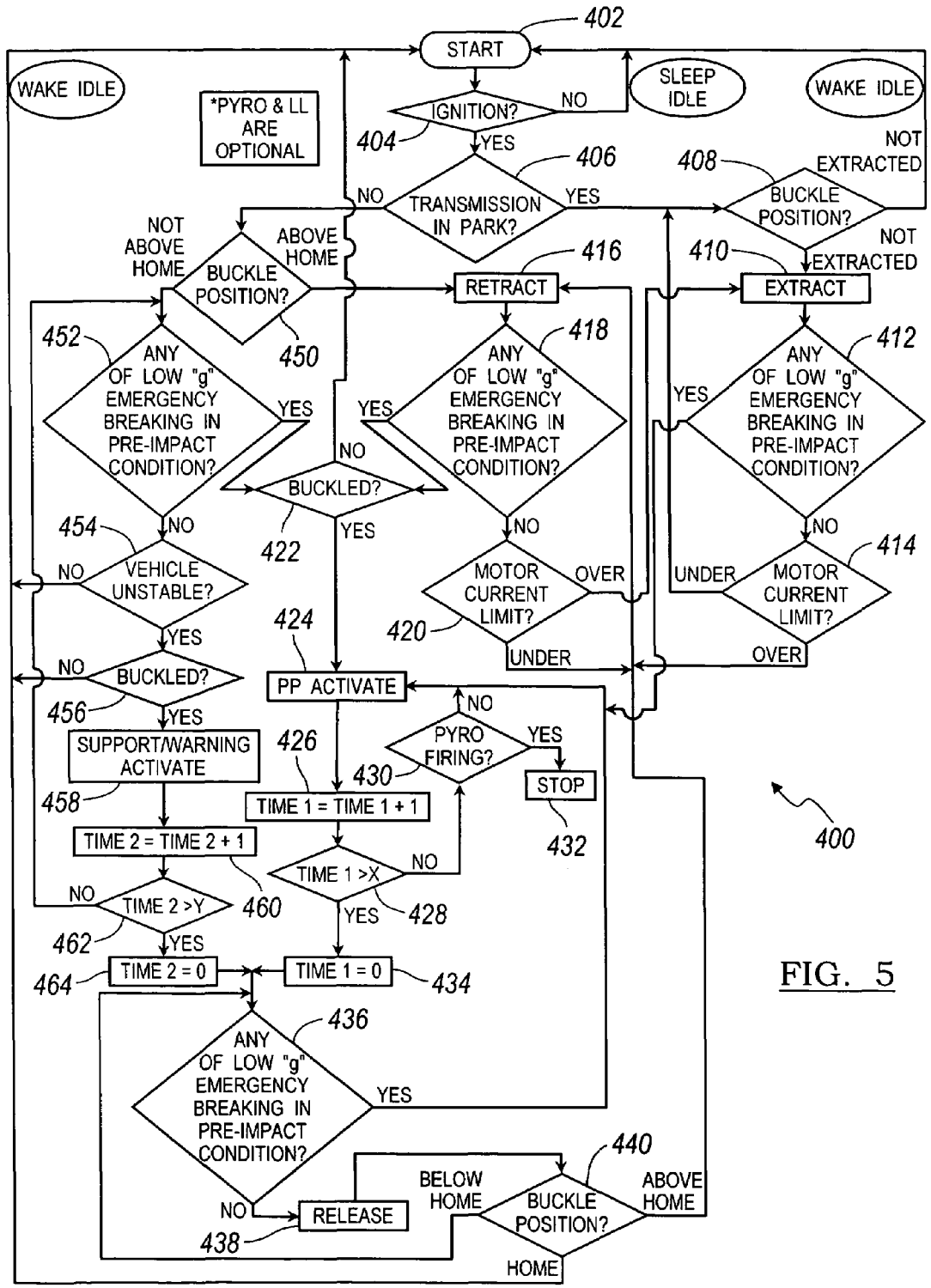
FIG. 5 is a flow diagram illustrating an alternate control strategy for providing pre-pretensioning of a vehicle seatbelt, in accordance with an embodiment of the present invention.

Referring now to FIG. 5, an alternate control strategy 400 for a system having a pre-pretensioner for pre-pretensioning a vehicle seatbelt is illustrated in flowchart form, in accordance with an embodiment of the present invention. Control strategy 400 is initiated at block 402 when a driver or passenger enters the vehicle. At block 404, the system determines whether the ignition has been activated. If the ignition has not been activated, then the system returns to block 402. However, if the ignition has been activated, then the system monitors the transmission to determine whether it has been moved out of park, as represented by block 406. If the transmission has been moved out of park, then at block 408 the system determines the current buckle position. If at block 408 the system determines that the buckle is in an extracted position, then the system returns to block 402. If however, at block 408 the system determines that the buckle position is in an unextracted position then, at block 410, the system extracts the buckle. At block 412, the system determines whether a low vehicle deceleration (low "g"), emergency braking, or pre-impact condition exists. If the system determines that none of these conditions exist then the motor current is monitored to determine whether it has reached a motor current limit threshold, as represented at block 414. If the motor current limit threshold has not been reached then the system returns to block 408. However, if the system determines that the motor current limit threshold has been exceeded, then the system checks the buckle position, as represented by block 440.

If however, at block 406, the system determines that the transmission has not been moved out of park, then the buckle position is monitored at block 450. If the buckle position is determined to be above the "home" position then the system retracts the buckle at block 416. At block 418, the system determines whether a low deceleration (low "g"), emergency braking or pre-impact condition exists. If none of these conditions exist, then the system monitors the motor current at block 420. If the system determines that the motor current has not exceeded a motor current limit, then the system returns to block 416 where the buckle continues to be retracted. However, if at block 420 the system determines that the motor current limit has been exceeded, then the system returns to block 410 where the buckle is extracted. However, if at block 418 the system determines that one of the above-mentioned conditions do not exist, then the system determines whether the buckle has been buckled, as represented by block 422. If the system determines that the buckle has not been buckled then the system returns to block 402. However, if the system determines that the buckle is buckled then the pre-pretensioner device is activated, as represented by block 424. A timer is activated at block 426 and at block 428 the system determines whether the timer has exceeded a predefined threshold X. If the timer has not exceeded a predefined threshold X, then the system determines whether a pyrotechnic pretensioner has been fired, as represented by block 430. If the pyrotechnic pretensioner has been fired, then the system stops at block 432. However, if the pyrotechnic pretensioner has not been fired, then the system returns to block 424. However, if at block 450 the buckle position is determined to be not above home, then the system determines whether a low deceleration, emergency braking, or pre-impact condition exists, as represented by block 452. If any of the conditions exist then the system returns to block 422. If however, the system determines that none of these conditions exist then at block 454 the system determines whether the vehicle is stable. If the system determines that the vehicle is stable, then the system returns to block 402. However, if the system determines that the vehicle is unstable then the system determines whether, at block 456, the seatbelt is buckled. If the system determines that the seatbelt is not buckled, then the system returns to block 402. If however, the system determines that the buckle is buckled, then the system activates the support/warning device at block 458. At block 460 a timer is initiated and at block 462 the timer is checked to determine whether it has exceeded a predefined threshold Y. If the timer has not exceeded the predefined threshold Y, then the system returns to block 452. If however the system determines that the timer has exceeded the predefined threshold Y, the timer is reset at block 464. At block 436, the system determines whether the low G, emergency braking or pre-impact conditions still exist. If these conditions still exist, the system returns to block 424. If the system determines that these conditions do not exist, then the system releases the buckle, as represented by block 438. At block 440, the system determines the buckle position. If system determines that the buckle is in the above home position, then the system returns to block 416. If the system determines that the buckle is in the home position, then the system returns to block 402. Finally, if the system determines that the buckle is in the below home position, then the system returns to block 436.

Figure 6:
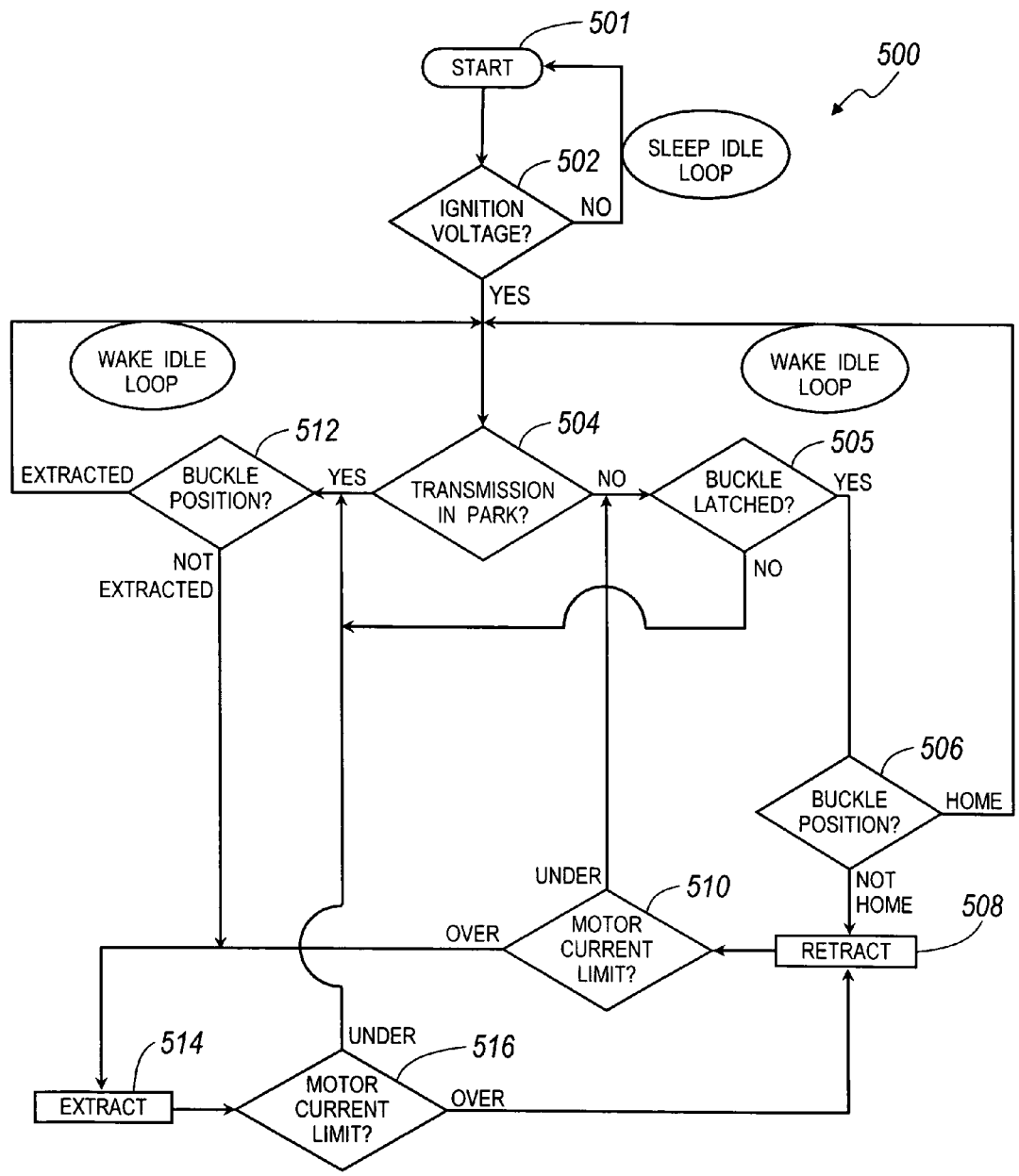
FIG. 6 is a flow diagram illustrating a method of operation of a system utilizing the pre-tensioning device shown in FIG. 1, in accordance with an embodiment of the present invention.

Referring now to FIG. 6, an alternate control strategy 500 for controlling a system having a device 10 is illustrated in flow chart form, in accordance with an embodiment of the present invention. The alternate control method 500 is initiated when a driver enters the vehicle, as represented by block 501. The seatbelt buckle, at this point, will already be in the "presented" state, which means that it is raised and in a higher position than it would be when the seatbelt is buckled and in use. The driver buckles the seatbelt by inserting the seat belt latch plate into the buckle. This is done more easily since the seatbelt buckle is at a higher position, relative to the seat. At block 502 the ignition of the vehicle engine is monitored. If the driver does not start the ignition, then the system returns to the block 501 and the ignition (voltage) is checked again. However, if the driver starts the ignition then, at block 504, the system determines whether the driver has moved the transmission of the vehicle out of the park position. If the driver has moved the transmission out of park, the system determines whether the buckle is latched, as represented in block 505.

If the buckle is not latched, the buckle position is monitored to determine the next action to take, as represented by block 502. If the buckle is extracted or not in the "home" position, then the system returns to block 504. However, if the buckle is not extracted or in the "home" position then the system extracts the buckle and monitors the motor current as represented by blocks 504 and 516. At block 516, the system determines whether the motor current has exceeded a predefined motor current limit. Once the predefined motor current limit has been reached, the system determines that the buckle is not in the "home" position and stops buckle extraction, as represented by blocks 512 and 516.

However, if the buckle is latched, movement of the seat belt buckle is accomplished by first monitoring the position of the buckle, at block 506. If the buckle is in the home position, then the system returns to block 504. However, if the buckle is not in the "home" position, then the system activates motor 20 to retract the buckle at block 508 and monitors the current draw of the motor, as represented by block 510. Once a predefined motor current limit has been reached, the system determines that the buckle is in the "home" position and stops buckle retraction, as represented by blocks 506 and 510. If the passenger side is equipped with the same tensioning device 20, the passenger buckle will be pulled down in unison with the driver-side buckle. If the driver returns the transmission to the park position, the buckle will move back up to an extracted position to allow for easy unbuckling of the latch plate from the buckle.

As any person skilled in the art of systems and methods for adjusting seatbelt tension will recognize from the previous detailed description and from the figures and claims, modifications and changes can be made to the preferred embodiments of the invention without departing from the scope of this invention defined in the following claims.

We claim:

1. A device for tensioning a vehicle seatbelt, the device comprising:
    a motor having a motor output for transferring rotational energy developed in the motor;
    a pulley in communication with the motor, the pulley including a ring gear;
    a first cable having first and second ends, wherein the first end is coupled to the pulley;
    a second cable having a second cable first end and a second cable second end, the second cable second end including a spline that engages the ring gear in the pulley; and
    a seatbelt buckle coupled to the second end of the first cable, whereby rotation of the pulley causes movement of the seatbelt buckle.

2. The device of claim 1 wherein the second cable first end is coupled to the motor output.

3. The device of claim 1 further comprising a spindle disposed through a bore in the pulley for slidably engaging and supporting the pulley.

4. The device of claim 3 further comprising an attachment bracket for securing the pulley to a vehicle structure.

5. The device of claim 4 further comprising a torsion member having a first end disposed within a bore in the spindle and a second end disposed within an aperture in the attachment bracket.

6. The device of claim 1, wherein the second cable first end is coupled to the motor output and the second cable second end is coupled to the pulley, the motor rotating the second cable to drive the pulley.

7. A device for tensioning a vehicle seatbelt, the device comprising:
- a motor having a motor output for transferring rotational energy developed in the motor;
- a pulley in communication with the motor output for receiving the rotational energy developed in the motor;
- a first cable having first and second ends, wherein the first end is coupled to the pulley;
- a second cable having a second cable first end and a second cable second end, the second cable second end including a spline that engages a ring gear in the pulley;
- a seatbelt buckle coupled to the second end of the first cable, whereby rotation of the pulley causes movement of the seatbelt buckle; and
- a pyrotechnic pretensioner coupled to the pulley and, upon activation of the pyrotechnic pretensioner, rotating the pulley to wind the first cable around the pulley.

8. The device of claim 7 wherein the pulley further comprises a ball track for receiving a plurality of balls injected by the pyrotechnic pretensioner thereby causing the pulley to rotate.

9. The device of claim 7, wherein the second cable first end is coupled to the motor output and the second cable second end is coupled to the pulley, the motor rotating the second cable to drive the pulley.

10. The device of claim 7, further comprising a load limiting mechanism operatively connected between the second cable and the pulley.

11. A method for tensioning a vehicle seatbelt, the method comprising:
- detecting a pre-impact condition;
- activating a first device connected to the vehicle seatbelt to tension the vehicle seatbelt if the pre-impact condition has been detected;
- determining whether a second device for tensioning the vehicle seatbelt has been activated within a predefined period of time;
- determining whether the predefined period of time has elapsed; and
- releasing the tension on the seatbelt if the second device has not been activated within the predefined period of time and the pre-impact condition has not been detected after the predefined period of time has elapsed.

12. The method of claim 11, further comprising determining whether the vehicle ignition has been activated.

13. The method of claim 11, further comprising determining whether the vehicle seatbelt is buckled.

14. The method of claim 11, further comprising determining whether the vehicle is stable.

15. The method of claim 14, further comprising activating a warning if the vehicle is determined to be unstable.

16. The method of claim 11, further comprising determining a state of a vehicle transmission.

17. The method of claim 11, further comprising determining a position of a seatbelt buckle.

18. The method of claim 17, further comprising activating a motor to change the position of the seatbelt buckle based on the determined position.

19. The method of claim 17, further comprising monitoring a current supplied to the motor.

20. The method of claim 19, further comprising comparing the monitored current to a current limit threshold.

21. The method of claim 20, further comprising deactivating the motor when the current has reached the current limit threshold.

* * * * *